US012781707B2

(12) United States Patent
Christensen et al.

(10) Patent No.: US 12,781,707 B2
(45) Date of Patent: Nov. 3, 2026

(54) WIND TURBINE WAKE LOSS CONTROL USING DETECTED DOWNSTREAM WAKE LOSS SEVERITY

(71) Applicant: VESTAS WIND SYSTEMS A/S, Aarhus N (DK)

(72) Inventors: Poul Brandt Christensen, Ry (DK); Mark Faber, Risskov (DK); Jakob Vestergaard, Risskov (DK); Mahmood Mirzaei, Skovlunde (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 2 days.

(21) Appl. No.: 18/879,700

(22) PCT Filed: Jun. 30, 2023

(86) PCT No.: PCT/DK2023/050176
§ 371 (c)(1),
(2) Date: Dec. 27, 2024

(87) PCT Pub. No.: WO2024/002451
PCT Pub. Date: Jan. 4, 2024

(65) Prior Publication Data

US 2025/0382944 A1 Dec. 18, 2025

(30) Foreign Application Priority Data

Jun. 30, 2022 (DK) ................................. 202270350

(51) Int. Cl.
*F03D 7/04* (2006.01)

(52) U.S. Cl.
CPC ........ *F03D 7/049* (2023.08); *F05B 2270/204* (2020.08); *F05B 2270/321* (2013.01)

(58) Field of Classification Search
CPC .... F03D 7/048; F03D 7/049; F05B 2270/321; F05B 2270/204
See application file for complete search history.

(56) References Cited

U.S. PATENT DOCUMENTS 10,018,177 B2 7/2018 Fu et al.
2011/0193344 A1* 8/2011 Lafferty .................. F03D 7/048 290/44

(Continued)

FOREIGN PATENT DOCUMENTS

EP 1790851 A2 5/2007
EP 2063108 A2 5/2009

(Continued)

OTHER PUBLICATIONS

Danish Patent and Trademark Office, 1st Technical Examination including the Search Report and Search Opinion for Application PA 2022 70350 dated Jan. 30, 2023 (Jan. 30, 2023).

(Continued)

*Primary Examiner* — Courtney D Heinle
*Assistant Examiner* — Andrew Thanh Bui
(74) *Attorney, Agent, or Firm* — Patterson + Sheridan, LLP; Gero G. McClellan

(57) ABSTRACT

The invention relates to controlling a wind turbine that generates wake during operation. The wind turbine is part of a wind park comprising a plurality of wind turbines. The invention includes receiving, from a further wind turbine of the plurality of wind turbines that is downstream of the wind turbine, a severity parameter indicative of a severity of wake loss experienced at the further wind turbine. The invention includes determining, based on the received severity parameter, one or more wake loss control actions for adjusting wake generated by the wind turbine. The invention includes (Continued)

controlling the wind turbine to operate in accordance with the determined one or more wake loss control actions.

16 Claims, 6 Drawing Sheets

(56) References Cited

U.S. PATENT DOCUMENTS

| | | | | |
|---|---|---|---|---|
| 2012/0133138 | A1* | 5/2012 | Sorensen | H02J 3/46<br>290/44 |
| 2013/0103202 | A1* | 4/2013 | Bowyer | F03D 7/0292<br>700/275 |
| 2017/0022974 | A1 | 1/2017 | Roma | |
| 2018/0010576 | A1 | 1/2018 | Brake et al. | |
| 2020/0400121 | A1 | 12/2020 | Lehn et al. | |
| 2023/0175485 | A1* | 6/2023 | Alberts | F03D 17/026<br>416/1 |

FOREIGN PATENT DOCUMENTS

| | | | |
|---|---|---|---|
| EP | 2757255 | A1 | 7/2014 |
| EP | 3394437 | B1 | 4/2022 |
| WO | 2004011799 | A1 | 2/2004 |

OTHER PUBLICATIONS

PCT International Search Report and Written Opinion of The International Searching Authority for Application PCT/DK2023/050176 dated Sep. 28, 2023 (Sep. 28, 2023).

* cited by examiner

WIND TURBINE WAKE LOSS CONTROL USING DETECTED DOWNSTREAM WAKE LOSS SEVERITY

TECHNICAL FIELD

The invention relates to controlling a wind turbine of a wind park comprising a plurality of wind turbines. In particular, the invention relates to controlling the wind turbine in accordance with one or more wake loss control actions to control wake generated by the wind turbine, the wake loss control actions being determined based on a detected severity of wake loss experienced at a further wind turbine of the plurality of wind turbines.

BACKGROUND

Wind turbines are used to capture energy in the wind as it flows past them, and to generate electrical power from the captured energy, e.g. to be supplied to an electrical grid. Often, several wind turbines are located in relatively close proximity to one another in a geographical area, where such a group of wind turbines may be referred to collectively as forming a wind park or wind farm.

The amount of wind energy that may be captured by a wind turbine varies in dependence on various environmental factors, such as wind speed and wind direction. For instance, a wind turbine may in general be most efficient at capturing wind energy when a rotor or nacelle of the turbine faces directly into the incoming wind direction, i.e. when the wind turbine is 'aligned' with the wind.

As wind flows past a wind turbine, wake is generated downstream of the wind turbine. That is, wind flow downstream of the wind turbine is perturbed or disturbed relative to upstream of the wind turbine. This disturbance can result in a reduction in the speed of the wind flow and/or an increase in the turbulence of the wind flow. Each of these result in a reduction in the amount of available energy that may be captured from the wind.

In a wind park, wake generated by a first, upstream wind turbine may impinge a second, downstream wind turbine, resulting in a reduction in the power generation efficiency of the downstream wind turbine relative to if the upstream wind turbine was not present, i.e. relative to if the wake effects caused by the upstream turbine were not present. This may be referred to as wake loss experienced by the downstream wind turbine.

It is known to perform so-called 'wake steering' of a wind turbine to steer generated wake of an upstream turbine away from a downstream turbine. This may involve controlling the upstream turbine to be misaligned relative to the incoming wind, e.g. by performing yaw control of the upstream turbine. While this may reduce the energy capturing efficiency of the upstream turbine, the increase in energy capturing efficiency of the downstream turbine may result in an overall increase in the energy capturing efficiency of the wind park.

Known methods for performing wake steering can be disadvantageous in that wake steering is not performed when it needs to be, it is performed when it does not need to be, and/or it is performed incorrectly, such that reduced wake effects experienced by downstream turbines are not properly achieved. In particular, known methods may not always achieve an overall increase in power generation (or energy capture) at the level of the wind park.

An example of wake control to achieve an overall increase in power generation can be found in EP2063108 A2. Here it is disclosed to determine a wake condition of a downwind turbine based on data received from the upwind turbine.

It is against this background to which the present invention is set.

SUMMARY OF THE INVENTION

According to an aspect of the present invention there is provided a method for controlling a wind turbine that generates wake during operation. The wind turbine is part of a wind park comprising a plurality of wind turbines. The method comprises receiving, from a further wind turbine of the plurality of wind turbines that is downstream or downwind of the wind turbine, a signal indicative of a severity of wake loss experienced at the further wind turbine. The method includes determining, based on the received severity signal, one or more wake loss control actions for adjusting wake generated by the wind turbine. The method includes controlling the wind turbine to operate in accordance with the determined one or more wake loss control actions.

The one or more wake loss control actions may be part of a predefined wake loss control strategy for controlling the wind turbine to adjust wake generated by the wind turbine as a function of wind direction in the vicinity of the wind turbine.

The severity signal is a signal indicative of the strength of the wake, also expressed as a signal indicative of the wake loss experienced at the further wind turbine, e.g. by detecting the wake strength at the further wind turbine downstream of the wind turbine. The downstream wind turbine determines the strength of the wake experienced by the downstream wind turbine and converts this detected strength into a severity signal which is transmitted to the wind turbine causing the wake, i.e. the upstream wind turbine (or the wind turbine). The upstream wind turbine receives the severity signal as a received severity signal.

The received severity signal may be a gain. The predefined wake loss control strategy may be a gain-scheduled control strategy. The method may comprise applying the gain to the gain-scheduled control strategy to determine the one or more wake loss control actions to be performed. Controlling the wind turbine may comprise controlling the wind turbine in accordance with the gain-scheduled control strategy.

The gain-scheduled control strategy may comprise performing one or more wake loss control actions to adjust wake generated by the wind turbine if the received gain indicates that the severity of wake loss experienced at the further wind turbine is above a predefined threshold.

In some examples, no wake loss control actions are performed as part of the gain-scheduled control strategy if the received gain indicates that the severity of wake loss experienced at the further wind turbine is below the predefined threshold.

The method may comprise, determining a severity parameter indicative of the severity of wake loss experienced at the further wind turbine; and, transmitting the determined severity parameter as the severity signal to the wind turbine.

In embodiments, the severity parameter reflects a determined wind speed deficit at the further wind turbine. The wake severity may be based on a determined (rotor averaged) wind speed deficit experienced at the further turbine. A rotor averaged wind speed deficit risks lowering the power performance. The rotor averaged wind speed deficit may be determined based on a comparison of the power production between the upstream (the wind turbine) and downstream turbines (the further wind turbine). Also a measured difference in wind speed measurements, e.g. the nacelle anemometer wind speed measurement may be used to express the wind speed deficit. However, here the measurements should be used as a basis for estimating the rotor average wind speed instead of simply using the point measurement values. Also a difference in turbulence intensity between the wind turbine and the further turbine may be used to determine a wake added turbulence.

Upon receipt of the determined severity parameter as a severity signal at the wind turbine, a comparison can be made with a similar signal of the wind turbine to determine the wind speed deficit.

Such severity parameters may be improved by a determination of which side of the wake the further turbine is placed.

The method may comprise, at the further wind turbine: determining a severity parameter indicative of the severity of wake loss experienced at the further wind turbine; and, transmitting the determined severity parameter as the severity signal to the wind turbine.

It may be advantageous to determine the severity parameter at the further wind turbine without taking into account signals from the (upwind) turbine. In this manner the wake loss control actions can be based on the actual wake conditions at the further wind turbine.

In embodiments the severity signal and/or severity parameter is determined based on sensor measurements at the wind turbine experiencing the wake loss.

The method may comprise: receiving sensor signals from one or more sensors of the further wind turbine; and, determining, based on the received sensor signals, an imbalance parameter indicative of loading imbalance on a rotor of the further wind turbine. The severity parameter may be determined based on the determined imbalance parameter and is indicative of a magnitude of the loading imbalance.

The sensor signals from one or more sensors may be blade load signals from one or more blade load sensors of rotor blades of the further wind turbine. The imbalance parameter may be a yaw moment of the rotor of the further wind turbine, determined based on the received blade load signals.

The severity parameter may be determined based on a magnitude of the imbalance parameter and on wind direction relative to a defined wind direction in which the further wind turbine experiences a full wake condition.

The method may comprise determining, based on the magnitude of the imbalance parameter and on wind direction relative to the defined wind direction, a curve describing the imbalance parameter as a function of wind direction or nacelle yaw position. The method may comprise comparing the determined shape against a plurality of defined shapes each associated with a respective severity parameter. The severity parameter may be determined based on the comparison.

The imbalance parameter may be normalised based on one or more operating variables. The severity parameter may be determined based on the normalised imbalance parameter. Optionally, the one or more operating variables can include one or more of: a defined peak magnitude of imbalance parameter; wind speed; absolute output power; output power normalised based on rated power; and, an estimated thrust level of the further wind turbine.

The signal indicative of a severity of wake loss may in embodiments be received from two or more turbines, and wherein the one or more wake loss control actions for adjusting wake is determined based on the received severity signals severity from the two or more turbines The one or more wake loss control actions may comprise at least one of: performing yaw control to rotate a nacelle and rotor of the wind turbine about a yaw angle relative to a tower of the wind turbine to adjust a direction of wake generated by the wind turbine; performing tilt control to generate a tilt moment about a tilt axis to adjust a direction of the wake generated by the wind turbine; performing collective pitch control of rotor blades of the wind turbine; and, performing individual pitch control of the rotor blades of the wind turbine.

According to another aspect of the present invention there is provided a non-transitory, computer readable storage medium storing instruction therein that, when executed by one or more computer processors, cause the one or more computer processors to execute the method defined above.

According to another aspect of the present invention there is provided a controller for controlling a wind turbine that generates wake during operation. The wind turbine is part of a wind park comprising a plurality of wind turbines. The controller is configured to receive, from a further wind turbine of the plurality of wind turbines that is downstream or downwind of the wind turbine, a signal indicative of a severity of wake loss experienced at the further wind turbine. The controller is configured to determine, based on the received severity signal, one or more wake loss control actions for adjusting wake generated by the wind turbine. The controller is configured to control the wind turbine to operate in accordance with the determined one or more wake loss control actions.

According to another aspect of the present invention there is provided a control system for a wind park comprising the wind turbine and the further wind turbine, as defined above. The control system comprises a controller as defined above. The control system comprises a further controller for controlling the further wind turbine, the further controller being configured to: determine a severity parameter indicative of the severity of wake loss experienced at the further wind turbine; and, transmit the determined severity parameter as the severity signal to the controller of the wind turbine.

According to an aspect of the present invention there is provided a wind turbine comprising a controller as defined above.

According to another aspect of the present invention there is provided a wind park comprising a control system as defined above.

BRIEF DESCRIPTION OF THE DRAWINGS

Examples of the invention will now be described with reference to the accompanying drawings, in which:

FIG. 4 schematically illustrates one of the downstream wind turbines of FIG. 1 experiencing the effects of wake generated by another of the wind turbine of FIG. 1 upstream thereof, wherein: FIG. 4(*a*) shows the downstream wind turbine in a full wake condition; FIG. 4(*b*) shows the downstream wind turbine in a left half plane wake condition; and, FIG. (c) shows the downstream wind turbine in a right half plane wake condition;

DETAILED DESCRIPTION

The invention provides a method and system that monitors wake loss at one or more downstream wind turbines relative to an upstream wind turbine in a wind park, and controls the upstream wind turbine based on the monitored wake loss at these downstream turbines, e.g. by performing wake steering of the upstream turbine. In particular, the effect that wake generated by the upstream wind turbine has on downstream wind turbines is monitored, e.g. a severity of the loading experienced by one or more components of the downstream turbines (in particular, for certain wind conditions), and appropriate control of the upstream turbine to mitigate these effects based on the identified wake loss severity is performed, e.g. in a manner that increases or maximises power output of the wind park as a whole. This is in contrast to some known wake steering approaches, in which only wind conditions at the (upstream) wind turbine to be controlled are taken into account when determining how to control the wind turbine, or only wind conditions at one or more downstream turbines are taken into account.

Figure 1:
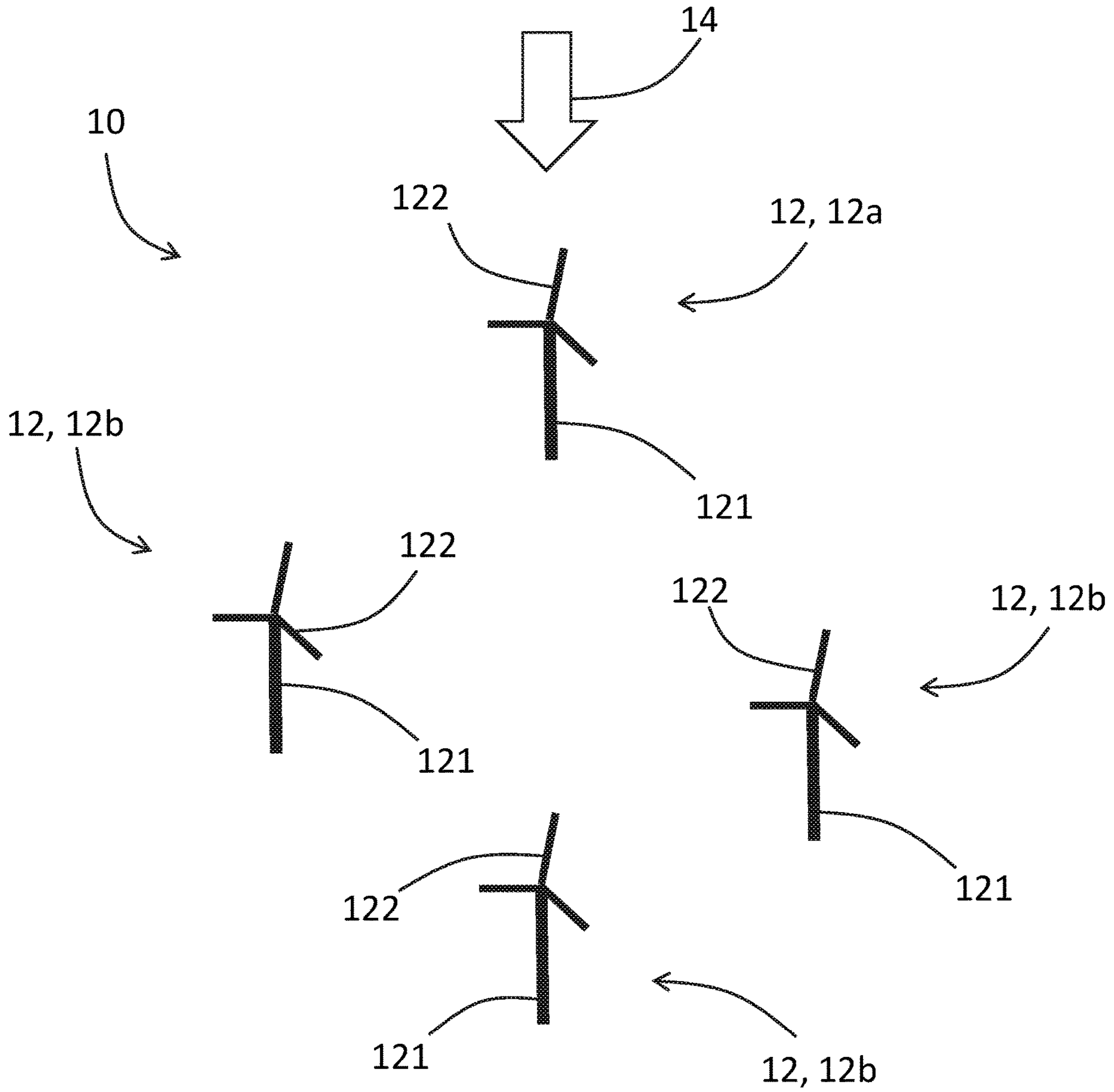
FIG. 1 schematically illustrates a wind park including a plurality of wind turbines in accordance with an aspect of the present invention.

FIG. 1 shows a schematic illustration of a wind park or wind farm 10 comprising a plurality of wind turbines 12. Each wind turbine 12 includes a tower 121, a nacelle disposed at the apex of, or atop, the tower, and a rotor operatively coupled to a generator housed inside the nacelle. In addition to the generator, the nacelle houses other components required for converting wind energy into electrical energy and various components needed to operate, control, and optimise the performance of the wind turbine 12. The rotor of the wind turbine 12 includes a central hub and three rotor blades 122 that project outwardly from the central hub.

Each wind turbine 12 includes a control system or controller (not shown in FIG. 1). The controller may be placed inside the nacelle, in the tower or distributed at a number of locations inside (or externally to) the turbine 12 and communicatively connected to one another. In addition, the wind park 10 may include a (central) controller that is communicatively connected to the wind turbine controllers.

The rotor blades 122 are pitch-adjustable. The rotor blades 122 can be adjusted in accordance with a collective pitch setting, where each of the blades are set to the same pitch value. In addition, the rotor blades 122 are adjustable in accordance with individual pitch settings, where each blade 122 may be provided with an individual pitch setpoint. The control system/controller of the respective wind turbine 12 may determine collective and/or individual pitch settings and output/transmit control signals to appropriate actuators of the wind turbine 12 to actuate pitch bearings of the wind turbine 12 to control the pitch angle of the rotor blades 122 in accordance with the determined pitch settings.

Each wind turbine 12 may be configured to adjust a yaw, e.g. relative to the wind in the vicinity of the respective wind turbine 12. In particular, each turbine 12 may comprise a yaw bearing between the tower 121 and nacelle, which allows for rotational motion of the nacelle (and attached components, including the rotor and rotor blades 122) relative to the tower in order to adjust a yaw angle of the wind turbine 12 relative to the wind, i.e. rotation about a tower axis of the turbine 12 (lateral or horizontal adjustment). The control system/controller of the respective wind turbine 12 may determine a desired yaw angle for the wind turbine 12, and output a control signal to control a yaw drive mechanism of the turbine 12 to rotate the nacelle relative to the tower 121 via the yaw bearing in accordance with the desired yaw angle.

Wake steering may also be obtained by tilt moment control whereby means of individual pitching generates a tilt moment on the rotor which may direct the wake in a vertical direction.

Each of the wind turbines 12 in the wind park 10 is configured to capture energy from the wind flowing past, and to convert the captured wind energy into electrical power, e.g. to be provided to the electrical grid. It is generally desired to maximise the amount of wind energy captured by a wind turbine in order to maximise the amount of power the turbine generates. Each wind turbine 12 monitors the wind conditions in its vicinity, and controls/adjusts one or more components of the wind turbine 12 as appropriate to maximise the captured wind energy based on the monitored wind conditions. Each wind turbine 12 may include one or more sensors for measuring one or more aspects of the wind conditions in the vicinity of the turbine 12, e.g. wind speed, wind direction, etc. For instance, each turbine 12 may include one or more accelerometers for this purpose, e.g. located in the nacelle.

Each wind turbine 12 may be controlled to balance maximising the captured energy/power production of the turbine against (minimising) the loading experienced by one or more components of the turbine 12. If the loading, e.g. extreme or fatigue loading, experienced by the wind turbine components is too high then this can result in reduced lifespan or even failure of the components. Each turbine 12 may include sensors for monitoring the loading of different wind turbine components. For instance, each turbine 12 may include blade load sensors placed at, or in the vicinity of, a root end of each blade 122 in a manner such that the sensor detects loading in the blade 122. Depending on the placement and the type of sensor, loading may be detected in the flap (flapwise) direction (in/out of plane) or in the edge (edgewise) direction (in-plane). Such sensors may be strain gauge sensors or optical Bragg-sensors, for instance.

In general, in order to maximise the amount of energy that a wind turbine captures from the wind, the wind turbine may be controlled to be aligned with the incoming wind direction. That is, the wind turbine may be controlled so that the rotor or nacelle points directly into the incoming or oncoming wind. A difference between the wind direction and the nacelle/rotor direction—i.e. where the wind turbine is misaligned with the wind direction—may be referred to as a yaw error.

FIG. 1 schematically illustrates a direction 14 of wind flow in the wind park 10. As the wind flows past a first one of the turbines 12*a* in the wind park 10, wake is generated downstream of the wind turbine 12*a*. This means that wind flow downstream of the wind turbine 12*a* is perturbed or disturbed relative to upstream of the wind turbine 12*a*, resulting in a reduction in the speed of the wind flow and/or an increase in the turbulence of the wind flow.

Depending on the positioning of the other wind turbines 12*b* in the wind park 10 relative to the (first) wind turbine 12*a*, the wind flow past one or more of the other wind turbines 12*b* may include wake effects caused by the wind flow past the first wind turbine 12*a*. The wind turbine that generates/causes the wake may be referred to as the upstream or upwind wind turbine 12*a*, and the one or more wind turbines that experience effects of the generated wake may be referred to as downstream or downwind wind turbines 12*b*.

Upstream wind turbines tend to produce more energy than downstream wind turbines because of the effects of wake on the downstream wind turbines from the upstream wind turbines. In particular, wake effects from upstream wind turbines results in reduced wind speed and increased turbulence in the vicinity of the downstream wind turbines relative to the upstream wind turbines. It is known to control an upstream wind turbine to adjust generated wake in a manner that is intended to reduce the effects of the wake on one or more wind turbines downstream of the upstream wind turbine. In particular, so-called wake steering may be performed to change a direction of generated wake, for instance. This may be performed by misaligning the upstream wind turbine relative to the incoming wind direction.

Figure 2:
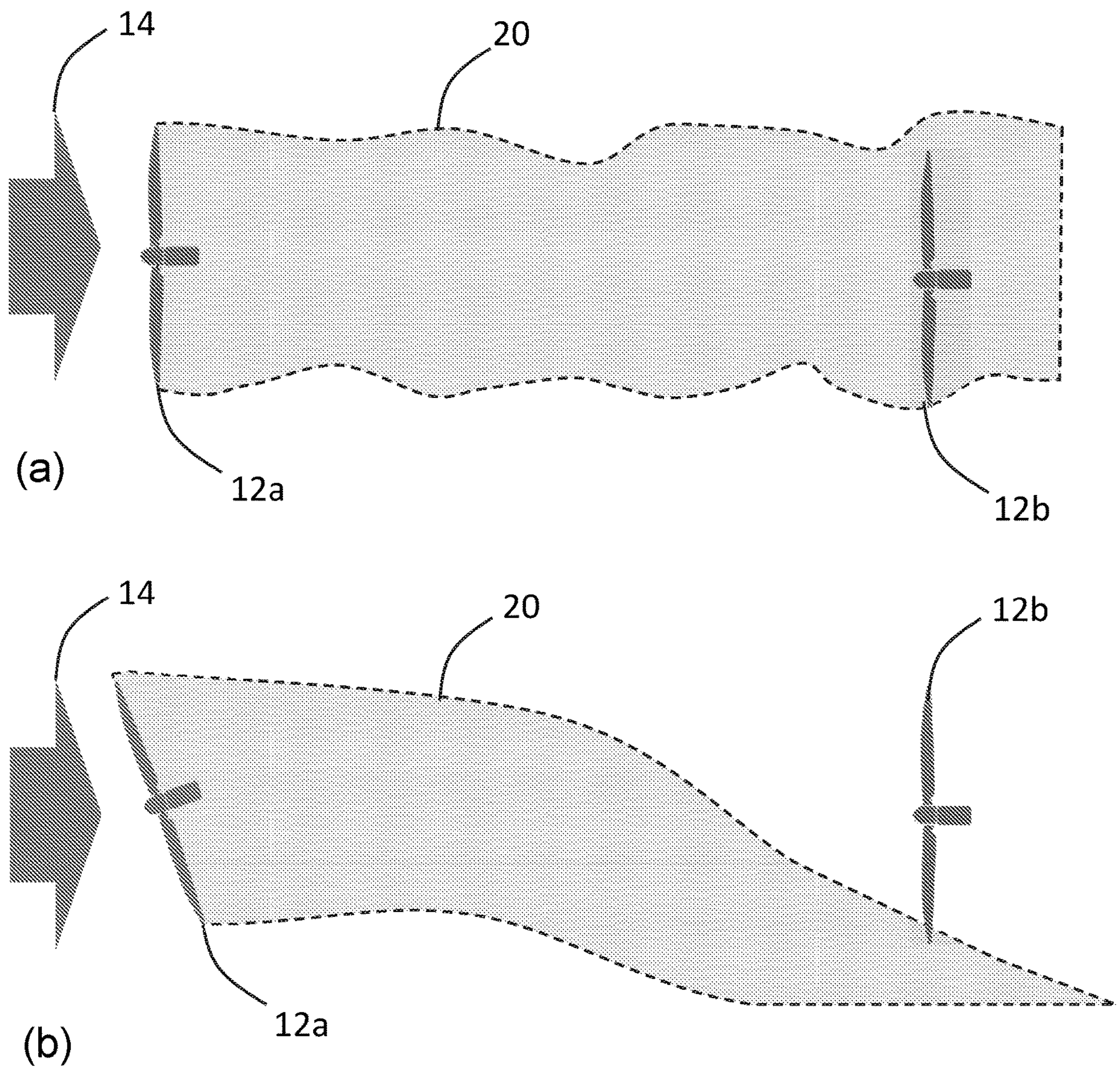
FIG. 2(*a*) schematically illustrates wake generated downstream of one of the wind turbines of FIG. 1 when the wind turbine is aligned with the incoming wind direction, and FIG. 2(*b*) schematically illustrates the generated wake when the wind turbine of FIG. 2(*a*) is misaligned relative to the incoming wind direction.

FIG. 2 schematically illustrates how wake steering may be utilised to adjust generated wake. In particular, FIG. 2(*a*) shows a case in which the upstream wind turbine 12*a* is aligned with the incoming wind direction 14. In this case, it is seen that the wake 20 generated downstream of the upstream wind turbine 12*a* is directed towards another wind turbine 12*b* downstream of the upstream wind turbine 12*a*. As the downstream wind turbine 12*b* experiences the effects of the generated wake 20, then this reduces the amount of wind energy that may be captured by the downstream wind turbine 12*b*. FIG. 2(*b*) shows a case in which the upstream wind turbine 12*a* is misaligned relative to the incoming wind direction 14, e.g. a yaw angle of the upstream wind turbine 12*a* is adjusted relative to FIG. 2(*a*). It is seen that this changes the direction of the generated wake 20 such that the downstream wind turbine 12*b* does not experience the effects of the generated wake 20, or at least experiences reduced effects thereof.

Known methods for performing wake steering may be based on monitored wind conditions in the vicinity of the (upstream) wind turbine to be controlled, and on retrievable information relating to the layout of a wind park, i.e. the positioning of wind turbines relative to one another in the wind park. For instance, for a particular measured—or otherwise ascertained, e.g. estimated—wind direction in the vicinity of the upstream wind turbine to be controlled, it may be predicted that wake in a certain direction and/or a certain strength/severity is generated downstream of the wind turbine, e.g. when the wind turbine is aligned with the wind direction. If the predicted wake direction and/or severity is such that its effects are expected to be experienced by another wind turbine downstream of the upstream wind turbine (based on the wind park layout information), then one or more wake control actions, e.g. wake steering of the upstream wind turbine may be performed to adjust a direction and/or severity of the wake generated by that wind turbine.

However, such known methods may not always be able to accurately predict when generated wake effects will be experienced by downstream wind turbines and be detrimental to the amount of wind energy that may be captured by the downstream turbines. This may be for several reasons. For instance, a layout of the wind park available to the upstream wind turbine may not be accurate, i.e. the relative positioning of the wind turbines in the wind park may not be accurate, such that it is incorrectly predicted when generated wind flow is directed towards one or more downstream turbines. Also, other aspects of the prevailing wind conditions—e.g. wind speed, level of turbulence, wind shear/veer, atmospheric stability—can influence wake generated downstream of a wind turbine, and how it develops. Furthermore, different aspects of a wind park—e.g. the terrain and/or vegetation between different turbines—can influence the development and path of wake. The wind direction measurement, and/or a positioning (e.g. yaw angle) of the rotor or nacelle of an upstream turbine, that is used to determine and adjust wake may be inaccurate (e.g. if the sensors used to measure these quantities are faulty or incorrectly calibrated), which can also lead to differences between actual and predicted wake effects downstream.

The present invention is advantageous in that it provides a method and system for reducing the wake loss (i.e. the reduction in wind energy capturing efficiency or capability) suffered or experienced by wind turbines in a wind park, in a manner that can increase or maximise overall wind energy capture across a wind park that includes a plurality of wind turbines. In particular, this is achieved by monitoring the (actual) effects of wake generated by an upstream wind turbine on one or more downstream wind turbines, and to use these monitored effects from the downstream turbines to determine how to control the upstream turbine to reduce wake loss experienced at the downstream turbines in a manner that increases overall wind park-level power production.

The invention in particular uses the monitored downstream wake effects to determine a severity of wake loss being experienced by a downstream wind turbine, and uses this determined wake loss severity to determine how to control the upstream wind turbine in respect of generated wake adjustment. For instance, it may be determined to control the upstream wind turbine to perform one or more wake loss control actions, e.g. by activating a predefined wake loss control strategy of the upstream turbine, if the severity of the wake loss experienced by a downstream wind turbine is above a defined threshold severity. For instance, if the downstream wake loss severity is below a certain threshold, then controlling the upstream turbine in a manner to reduce downstream wake effects may not have the desired effect of increasing overall power production of the wind park.

Such estimations of when to activate a wake loss control strategy at the upstream wind turbine so that overall wind park power generation is maximised may already be included in the upstream turbine control strategy. However, an estimated or predicted severity of downstream wake loss may be based on monitored wind conditions at the upstream turbine or at the wind park. The actual wake loss experienced downstream may differ from the expected levels for one or more of the reasons/sources of error outlined above. The invention therefore beneficially uses actual monitored wake loss severity at one or more downstream wind turbines to determine if performing one or more wake control actions at the upstream turbine will in fact have the desired result of increasing overall wind park power production.

Referring back to FIGS. 1 and 2, a controller of the upstream wind turbine 12*a* may be configured to implement a predefined wake loss control strategy as a function of wind direction, and other monitored wind conditions, in the vicinity of the wind turbine 12*a*. The predefined wake loss control strategy may involve the controller performing one or more control actions to reduce or mitigate wake loss experienced by one or more of the downstream wind turbines 12*b* at specific monitored wind directions predicted or expected to result in downstream wake loss. For instance, the control actions could include yaw angle control of the upstream turbine 12*a* to redirect downstream wake away from the downstream turbines 12*b*. The predefined control strategy may be activated to perform the control actions, e.g. wake steering, for a predefined range or interval of monitored wind directions ('wake sector') deemed to result in wake loss downstream. On the other hand, the predefined control strategy may be deactivated if the monitored wind direction is outside of the predefined range such that no control actions to mitigate wake loss are performed. When the predefined control strategy is not activated (deactivated), the upstream wind turbine 12*a* may be controlled in accordance with a standard control strategy, e.g. to maximise power generation, by aligning the wind turbine 12*a* with the incoming wind direction 14. The predefined wake loss control strategy, i.e. which control actions are performed for which wind conditions, may be determined offline based on historical, simulation or experimental data, or in any other suitable manner, e.g. including machine learning methods, such that it is known a priori.

As well as wind direction, the predefined strategy may also take into account (i.e. be a function of) other wind conditions such as wind speed. For instance, even if the wind direction is such that a downstream turbine is predicted to be in the generated wake, if the wind speed is relatively low then it may not be worth performing wake steering of the upstream turbine. This may be because the reduction in wake loss at one or more downstream turbines is sufficient to offset the reduction in energy capturing efficiency of the upstream turbine resulting from the wake steering. In one example, therefore, the predefined control strategy may be activated only if the wind speed is high enough, for instance.

In order to determine an actual severity of wake generated by the upstream wind turbine 12*a* and experienced by one or more downstream wind turbines 12*b*, one or more aspects of the operation of the downstream wind turbine(s) 12*b* are monitored. For instance, loading experienced by the rotor blades 122 of the downstream wind turbine 12*b* may be monitored as a means for detecting wake effects or wake loss experienced by the downstream wind turbine 12*b*, e.g. blade loading may increase as a severity of the waked flow in which a wind turbine is operating in increases.

In some examples, a parameter indicative of loading imbalance on the downstream turbine rotor may be determined and used as an indicator of wake loss. In one such example, an estimated or measured rotor tilt or yaw moment, e.g. based on blade load sensor signals, may be used to detect wake loss. If there are other factors influencing an imbalance of the rotor loading, then these may be removed, or compensated for, before performing subsequent analysis. For instance, if a wind turbine has individual pitch control (IPC) active, then the (measured) rotor yaw moment may be compensated to account for the correction of imbalances performed by the IPC.

Furthermore, the imbalance parameter may be normalised based on one or more operating variables of the downstream turbine 12*b*, with the severity parameter being determined based on the normalised imbalance parameter. Such operating variables could include a defined peak magnitude of imbalance parameter, wind speed, absolute output power, output power normalised based on rated power, and/or an estimated thrust level of the downstream wind turbine 12*b*.

Also, the severity parameter may be normalised based one or more factors. For instance, it could be normalised based on measurements from other turbines in the wind park. The severity parameter of a first turbine may be greater than that of another turbine if there is a smaller distance between turbines in the case of said first turbine compared to that of the other turbine. The severity parameter for each turbine may be sent to a central unit, e.g. in the wind park, and they may be compared and normalised with respect to the largest severity parameter, before being sent back to the respective turbines.

The normalization may be based on yaw moment peaks from other turbines (possibly also in other parks) with same rotor size and distance to upwind turbine when identifying the maximal yaw peak. A starting point for the normalization can be a simulated curve for various scenarios for a given rotor type, power rating, turbulence conditions, wind shear conditions, etc.)

The severity parameter may also be normalised based on values of a database of measurements of the severity of other turbines in operation at different wind parks, based on the predefined most severe wake that is considered possible/feasible (e.g. yaw moment trajectory as a function of wake), and/or based on other wind directions from the same turbine. Such normalisation may be performed with the purpose of avoiding the case in which the maximum severity that a (downstream) turbine may experience will always result in maximum wake loss control on the upstream wind turbine even though the maximum severity is not globally large in relation to other turbines.

Figure 3:
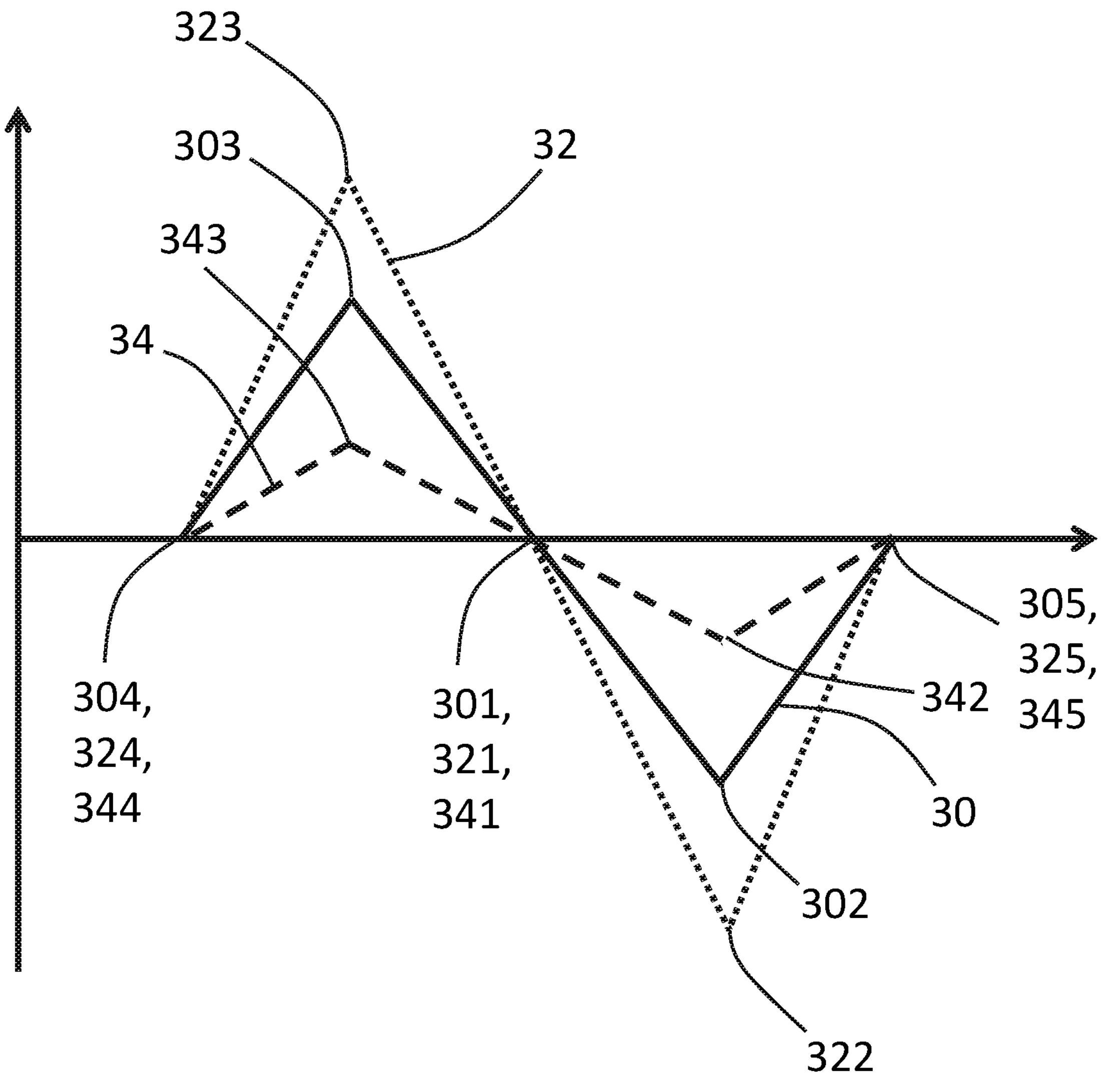
FIG. 3 shows illustrative plots of estimated yaw moment against absolute wind direction for one of the wind turbines of FIG. 1 downstream of another of the wind turbines of FIG. 1 that generates wake downstream thereof.
Figure 4:
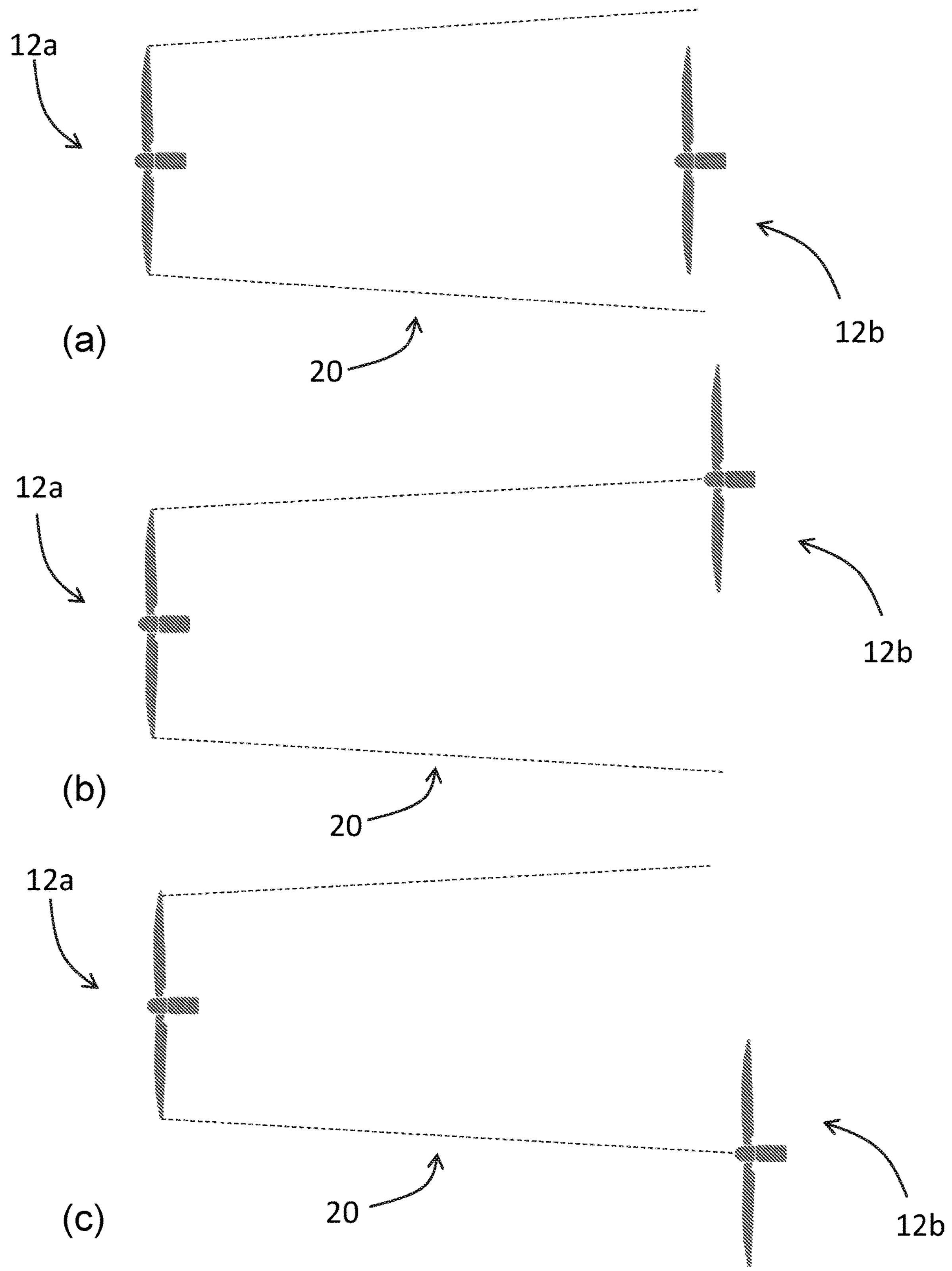

FIG. 3 shows illustrative plots/curves 30, 32, 34 of rotor yaw moment (along the y-axis, e.g. in kNm) against absolute wind direction (along the x-axis, in degrees) for a downstream wind turbine 12*b* that allows detection of a wake condition in which the turbine is operating 12*b*, and the severity of said wake condition. With further reference to FIG. 4, the rotor yaw moment allows for determination as to whether the downstream wind turbine 12*b* is in a so-called 'full wake condition', 'left half plane wake condition', 'right half plane wake condition', somewhere between these defined wake conditions, or outside of these wake conditions.

FIG. 4(*a*) schematically illustrates the downstream wind turbine 12*b* in a full wake condition. In particular, in a full wake condition, the downstream wind turbine 12*b* is fully in the wake 20 generated by the upstream wind turbine 12*a*. When this is the case, the blade loading effects caused by the wake at the downstream turbine 12*b* may substantially balance out (be equal) between left and right sides/halves of the rotor plane such that a yaw moment experienced by the rotor of the downstream turbine 12*b* is substantially zero, corresponding to the full wake condition points 301, 321, 341 of the respective plots 30, 32, 34 in FIG. 3.

FIG. 4(*b*) schematically illustrates the downstream wind turbine 12*b* in a left half plane wake condition. In particular, in a left half plane wake condition, (only) a left half of the rotor plane of the downstream turbine 12*b*—e.g. defined as the swept area of the rotor blades 122 of the turbine 12*b*—is in (or experiences the effects of) the wake 20 generated by the upstream wind turbine 12*a*. When this is the case, this may result in a maximum level/amount of imbalance in the blade loading between the left and right halves of the rotor plane such that a magnitude of a yaw moment experienced by the rotor of the downstream turbine 12*b* is at its maximum. This corresponds to the left half plane wake condition points 302, 322, 342 of the respective plots 30, 32, 34 in FIG. 3.

FIG. 4(*c*) schematically illustrates the downstream wind turbine 12*b* in a right half plane wake condition. This corresponds to the left half plane wake condition except that (only) the right half of the rotor plane is in the wake 20 generated by the upstream wind turbine 12*a*. This corresponds to the right half plane wake condition points 303, 323, 343 of the respective plots 30, 32, 34 in FIG. 3.

Referring to FIG. 3 in conjunction with FIG. 4, it will be understood that the points 304, 305, 324, 325, 344, 345 of the estimated yaw moment plots 30, 32, 34 correspond to the wind directions at which the downstream turbine 12*b* is just outside of the wake 20 generated by the upstream turbine 12*a*, i.e. the point at which the generated wake does not impact the estimated or measured yaw moment. It may be that it is desired for a wake loss control strategy of the upstream turbine 12*a* to activate/deactivate at wind directions 304, 305, 324, 325, 344, 345; however, the activation/deactivation wind direction can be set at any suitable wind directions based on the estimated or measured yaw moment. For instance, it may be desired that a downstream turbine is sufficiently in the generated wake before activating an upstream control strategy to mitigate the effects of downstream wake loss. It may also be desired to activate and deactivate the wake loss control strategy at different wind directions, i.e. to introduce hysteresis into the control strategy. This can guard against repeated activation and deactivation cycles of the control strategy, and can also guard against deactivation of the control strategy causing an increase in yaw moment at the downstream turbine (as the wake may be shifted back towards the directions of the downstream turbine).

It may be seen, therefore, that in FIG. 3 for a given wind direction in which the downstream wind turbine 12*b* experiences wake loss, e.g. a wind direction between points 304, 324, 344 and points 305, 325, 345, the yaw moment of the wind turbine rotor can vary. For instance, when in a left half plane wake condition, a magnitude of the rotor yaw moment is greatest for the plot 32, i.e. point 322, and smallest for the plot 34, i.e. point 342. This variation in rotor yaw moment for a given wind direction may be a result of different factors. For instance, a greater wind speed at the wind park 10 may result in rotor yaw moments of greater magnitude being experienced. A greater level of turbulence in the wind may also result in rotor yaw moments of greater magnitude being experienced; however, in a half wake situation a greater level of turbulence may result in a lower yaw moment peak as the wake mixing may be higher (and wake loss may be lower) at higher turbulence levels.

For a given wind direction, it may be regarded that the greater the magnitude of the rotor yaw moment of the downstream turbine 12*b*, the greater the wake loss being suffered by the downstream turbine 12*b*, i.e. the more severe the effects on the downstream turbine's energy capturing capability. A severity parameter that is based at least in part on rotor yaw moment may therefore be determined as an indication of wake loss experienced at a downstream wind turbine 12*b*.

Although the above is described with reference to monitoring a parameter indicative of loading imbalance—and, in particular, rotor yaw moment—to determine a severity or level of wake loss being experienced by a (downstream) wind turbine, it will be understood that different parameters of the wind turbine may be considered for this purpose. For instance, parameters indicative of turbulence, certain frequency content in fore-aft acceleration of the wind turbine (e.g. 3P content), tilt/yaw controller pitch actuation (at 1P) to correct for possible individual pitch control amplitude in order to determine the yaw moment as is would be without influence from the individual pitching applied to reduce asymmetrical rotor plane moments, side-side acceleration of the wind turbine tower or nacelle, and/or blade edge or flap moment acceleration/variation, may be used. In particular parameters which can be used to determine a rotor averaged wind speed deficit may be used.

As part of a predefined wake loss control strategy of an upstream wind turbine 12*a*, it may be known which wind directions are associated with different wake conditions at a downstream turbine 12*a*. For instance, it may be known that a wind direction corresponding to point 301, 321, 341 corresponds to a full wake condition at the downstream turbine 12*b*, a wind direction corresponding to point 302, 322, 342 corresponds to a left half plane wake condition at the downstream turbine 12*b*, a wind direction corresponding to point 303, 323, 343 corresponds to a right half plane wake condition at the downstream turbine 12*b*, etc.

The indication of wake loss severity—e.g. via the magnitude of the downstream rotor yaw moment—in combination with the wind direction allows for an appropriate wake control action to be performed at the upstream turbine 12*a*. In one example, this allows for a determination of which of the plots/curves 30, 32, 34 in FIG. 3 the downstream wind turbine 12*b* is operating on, and this determination may be used to select an appropriate wake loss control action to be performed at the upstream turbine 12*a*.

Figure 5:
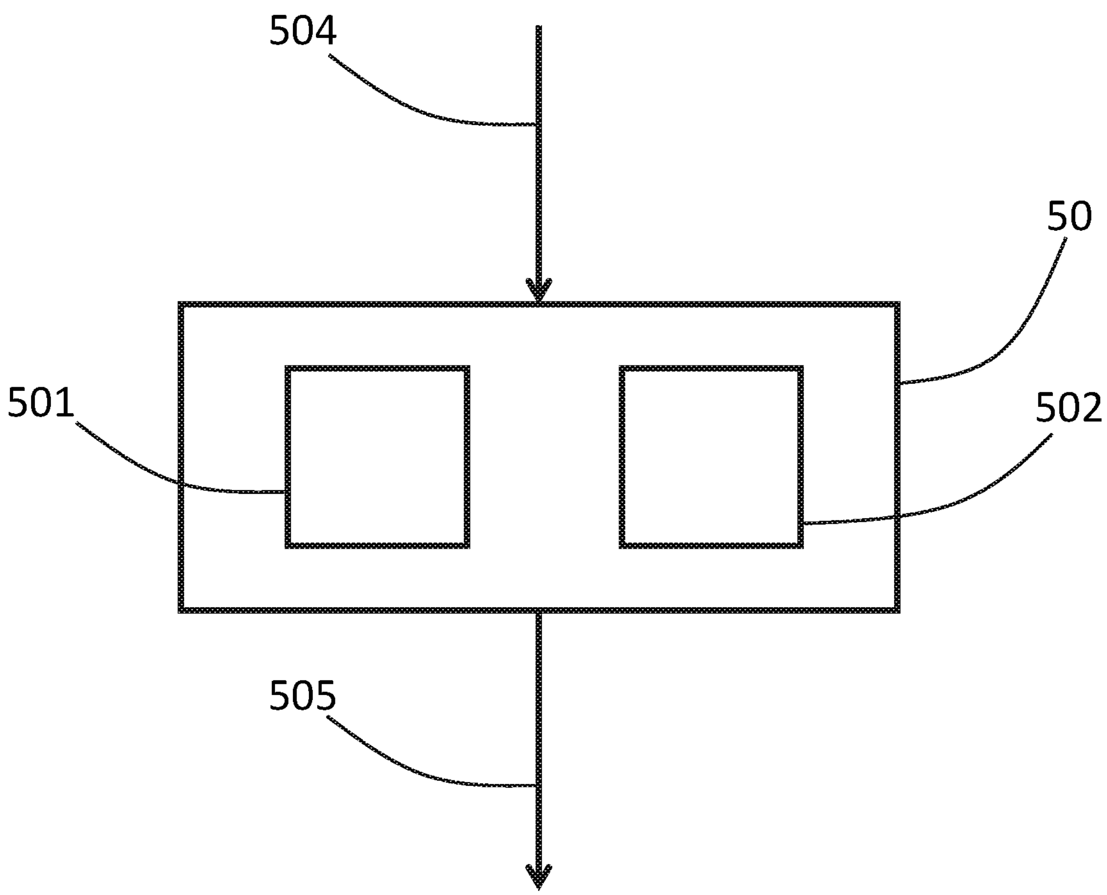
FIG. 5 shows a schematic representation of a controller, in accordance with an aspect of the invention, of one of the wind turbines of FIG. 1 that generates wake downstream thereof; and, FIG. 6 shows the steps of method performed by the controller of FIG. 5 in accordance with an aspect of the invention.

FIG. 5 schematically illustrates elements of a controller 50 of the upstream wind turbine 12*a*. The controller 50 may be located in a nacelle of the turbine 12*a*, for instance. The controller 50 includes one or more computer processors 501, and may include a data storage or memory 502. The controller 50 is configured to receive input signals 504, e.g. via an input of the controller 50. The input signals 504 can include a signal from one or more of the downstream wind turbines 12*b* indicative of the severity of wake loss being experienced by the downstream turbine 12*b*. The controller 50 is configured to output/transmit control signals 505, via an output of the controller 50. The output signals 505 can include one or more control signals for controlling operation of the wind turbine 12*a*, e.g. controlling pitch actuators to adjust the rotor blade pitch in accordance with determined pitch reference values, and/or controlling rotor or generator speed in accordance with determined speed references.

The described controller 50 may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

As mentioned above, an indication of the severity of wake loss being experienced by the downstream turbine 12*b* may be transmitted from (a controller of) the downstream turbine 12*b* to the upstream turbine controller 50. This indication of severity can take different forms in different examples. In particular, different processing steps of the overall process may be performed at different locations, including one or more of the downstream turbine controller(s), the upstream turbine controller 50, and a controller of the wind park 10.

In some examples, the indication of severity may be (raw) sensor data from one or more sensors of the downstream controller 12*b*. In an example in which the rotor yaw moment is used to indicate wake loss severity, blade load sensor data from one or more blade load sensors of the downstream turbine 12*a* may be transmitted to the upstream turbine controller 50. The controller 50 may then determine rotor yaw moment based on the received sensor data.

In other examples, the wake loss severity parameter, e.g. rotor yaw moment, may be determined at the downstream turbine controller, and then the determined parameter is transmitted from the downstream turbine controller to the upstream turbine controller 50.

In further other examples, an indication of how the wake loss control strategy is to be implemented or adjusted based on the determined severity parameter may be determined at the downstream turbine controller and then transmitted to the upstream turbine controller 50. In one such example, this could be in the form of a gain to be applied to the wake loss control strategy, or one or more wake control actions thereof, as described in greater detail below.

Figure 6:
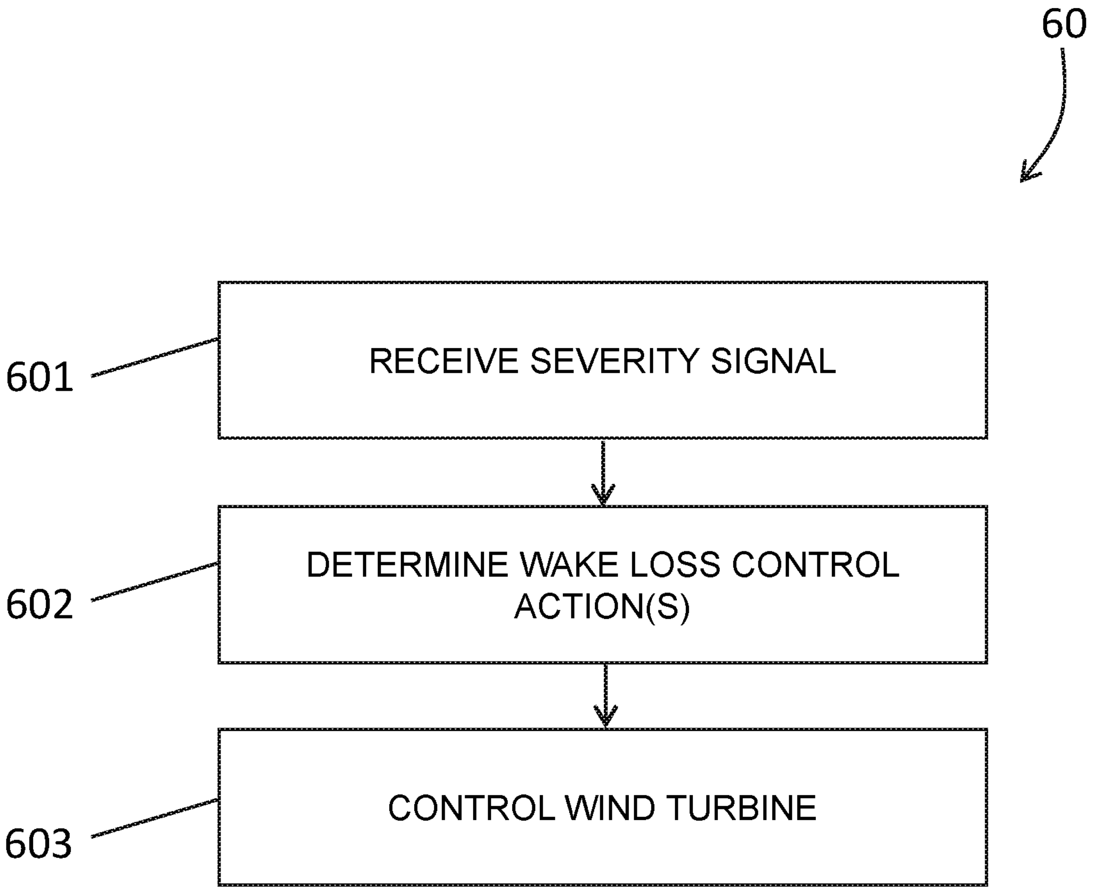

FIG. 6 summarises the steps of a method 60 performed by the controller 50 for controlling the wind turbine 12*a* in accordance with examples of the present invention. It will be understood, however, that one or more of the method steps shown in FIG. 6, and/or some or all other steps that may form part of the overall method in some examples, may be performed remote from the upstream wind turbine 12*a*, e.g. by a controller of one or more of the downstream wind turbines 12*b*, and/or by a controller of the wind park 10.

At step 601 of the method 60, the controller 50 receives an indication of a severity of wake loss experienced at one or more wind turbines 12*b* downstream of the upstream wind turbine 12*a*. As mentioned above, this indication may be in any suitable form. For instance, the indication may be in the form of raw sensor data from one or more sensors of the downstream turbine 12*b*, a determined parameter indicative of wake loss severity (e.g. a rotor yaw moment), and/or indication of how the wake loss control strategy of the upstream turbine 12*a* should be implemented, e.g. a gain.

At step 602 of the method 60, the controller 50 determines, based on the received indication of the wake loss severity, one or more wake loss control actions for controlling or adjusting wake generated by the upstream wind turbine 12*a*. In one example, the controller 50 is configured to implement a predefined wake loss control strategy at the upstream turbine 12*a*. This may include performing one or more wake control actions, e.g. wake steering, as a function of wind direction. For instance, the predefined wake loss control strategy may be activated at certain wind directions, e.g. wind directions in which the generated wake of the upstream turbine 12*a* results in wake loss at a downstream turbine 12*b*, such as for some or all of the wind directions corresponding to between the points 304, 324, 344 and points 305, 325, 345 in FIG. 3. The particular control actions taken as part of the predefined strategy may be different for different wind directions in which the control strategy is active. For instance, a greater amount of wake steering, e.g. actuation through a greater yaw angle (i.e. greater misalignment relative to the wind direction), may be implemented for a wind direction corresponding to a full wake condition (e.g. wind direction at point 301, 321, 341) compared to that for a wind direction nearer to points 304, 324, 344 or points 305, 325, 345, for instance. However, it may also be the case that for a given wind direction the misalignment angle of the upstream turbine varies with the wake loss severity (yaw moment) at the downstream turbine.

In such an example, the indication of wake loss severity may be used to determine whether to activate the predefined wake loss control strategy, and/or whether/how to adjust the wake control actions of the predefined control strategy.

A parameter indicative of wake loss severity, e.g. rotor yaw moment, may be determined, either: at the controller 50 based on received sensor data from the downstream turbine 12*b*: or, at the downstream turbine 12*b* and then transmitted to the upstream turbine controller 50. In an example, a gain is determined based on the wake loss severity parameter to be applied to the predefined wake loss control strategy. Again, the gain may be determined by the upstream turbine controller 50, or may be determined at a downstream turbine controller (or wind park controller) and then communicated to the upstream turbine controller 50.

The gain may be applied in any suitable way. In an example in which the gain is used to activate/deactivate the predefined wake loss control strategy, then it may be applied as follows. The wind direction may be monitored, e.g. by a sensor of the upstream turbine 12*a*. If the wind direction is in a range of wind directions expected/predicted to result in wake loss at a downstream turbine 12*a* such that the predefined wake loss control strategy is to be activated, then in this case a further determination is made based on the determined gain. In particular, in an illustrative example the gain may be determined to be one if the determined wake loss severity parameter value is above a defined threshold value, and zero if the determined wake loss severity parameter value is below the defined threshold value.

It is noted that when the severity parameter value is known, and in the case where it is rotor yaw moment, then when the wind direction is also detected, it may be determined on which of a plurality of defined plots/curves 30, 32, 34 the downstream turbine 12*b* is operating in. The gain may be determined based on the predefined plot/curve considered to describe current downstream turbine 12*b* operation.

The gain may be applied to the predefined control strategy, or to the wake loss control actions to be performed as part of the predefined control strategy. In this way, the predefined control strategy may be a gain-scheduled control strategy. The outcome in this example may therefore be that if the gain is one, then the wake control actions are performed at the upstream turbine 12*a* in accordance with the predefined control strategy. On the other hand, if the gain is zero then no wake loss control actions are performed (i.e. the wake loss control actions that would otherwise be performed are suppressed). For instance, this could mean that, for a given wind direction, for a severity level above the threshold the wind turbine is yawed through a defined yaw angle, e.g. 20 degrees, whereas for a severity level below the threshold no control action is taken. However, it will be understood that any suitable strategy may be implemented. For instance, yawing through different defined angles for different levels of severity may be implemented, e.g. 0 degrees for a severity level below a first threshold severity, 10 degrees for a severity between the first threshold severity and a second threshold severity (greater than the first threshold severity), and 20 degrees for a severity above the second threshold severity.

The defined threshold value may correspond to a downstream wake loss severity above which it is worth adjusting the wake generated upstream as it may result in an overall increase of the power production of the wind park 10. On the other hand, if the wake loss severity is relatively low, i.e. below the defined threshold value, then the wake loss effects at downstream turbines 12*b* is not sufficient to justify compromising the power producing capability of the upstream turbine 12*a*, e.g. by misaligning it relative to the incoming wind direction. The defined threshold value may be determined in any suitable manner, e.g. via experimentation, simulation, historical data, etc.

It will be appreciated that a gain to be applied to the predefined wake loss control strategy may be determined to be in any suitable form. For instance, the gain could include values between zero and one, so that a reduced level of wake loss intervention may be commanded in certain cases, e.g. 'mid-level' wake loss severity. This may constitute adjusting the predefined wake loss control actions rather than activating/deactivating them. For instance, a lower amount of wake steering may be implemented for relatively low wake loss severity values, and a higher amount of wake steering may be implemented for relatively high wake loss severity values.

In different examples, instead of using a gain to incorporate the detected downstream wake loss severity into the wake loss control strategy implemented by the controller 50, the severity may be incorporated as part of a control loop to minimise or eliminate the downstream wake loss. For instance, the parameter indicative of severity may be determined, e.g. rotor yaw moment, as described above, and one or more wake control actions may be determined to reduce the level of wake loss being experienced at the downstream turbine 12*b* based on the determined severity parameter. The determined wake loss control actions are implemented and then the wake loss severity parameter value is re-determined to assess whether the control actions have had the desired effect. Updated control actions may then be determined based on the updated severity parameter value. The aim of the control loop may be to reduce the severity parameter value to zero, or to below a certain threshold level. For instance, the aim of the control loop may in one example be to reduce the rotor yaw moment to zero. The control loop may be a proportional-integral (PI) control loop or a proportional-integral-derivative (PID) control loop.

In this way, feedback is provided to the controller 50 indicative of the effect that the implemented control actions are having. If, for example, the wake loss severity at the downstream turbine is relatively low then the control action (i.e. the wake offset from wake steering) may also be relatively low, or even be deactivated/disabled (not performed). The source of varying wake loss severity can be varying atmospheric stability, varying turbulence, wind shear, temperature, heating of terrain, etc.

An embodiment is thereby provided where the wind turbine is controlled in a control loop, to operate in accordance with the determined one or more wake loss control actions, to reduce the severity signal to a predefined level. The predefined level may be set to zero, or to a certain threshold level.

At step 603 of the method 60, the controller 50 controls the upstream wind turbine 12*a* in accordance with the determined one or more wake loss control actions. Note that this could be that no action is taken, e.g. if a zero gain is applied. The control actions may include any suitable way of controlling operation of the upstream wind turbine 12*a* to control/adjust the wake generated downstream thereof. For instance, the control actions can include performing yaw control to rotate the nacelle and rotor of the upstream 12*a* wind turbine about a yaw angle relative to the wind turbine tower to adjust a (lateral) direction of wake generated by the upstream wind turbine 12*a*. The control action may also include performing tilt moment control to direct generated wake towards the ground. The control actions may also include performing collective and/or individual pitch control of the wind turbine rotor blades 122 in a manner that changes the generated wake as desired.

The above-described method takes into account a severity of wake loss experienced by a downstream wind turbine. In some examples, the method may take into account further information relating to wake loss effects at a downstream turbine in order to control the upstream turbine to adjust its generated wake. For instance, in an example in which the upstream turbine controller 50 is configured to control the upstream turbine 12*a* in accordance with a predefined wake loss control strategy that implements wake control actions as a function of wind direction, operation of the downstream turbine 12*b* may be monitored to ensure that the assumptions under which the predefined control strategy are operating, i.e. which wind directions result in downstream wake loss, are in fact correct. The predefined control strategy may be set under the assumption that a particular wind direction results in a full wake condition at a downstream turbine 12*b*. If monitored sensor data from the downstream turbine 12*b* indicates that a full wake condition is in fact experienced at a different wind direction, then the predefined control strategy may be adjusted to offset the wind direction at which the wake loss control actions are performed by the difference between the assumed and monitored wind directions.

The upstream turbine may receive a signal indicative of wake loss severity from each of a plurality of downstream turbines. The wake loss control actions to be performed by the upstream controller may therefore be determined based on each of the received indications of severity in combination, e.g. a cumulative severity signal. The indications of severity may be combined (and optionally normalised) in any suitable manner. For instance, a greater weight may be placed on severity signals received from downstream turbines that are located closer to the upstream turbines than downstream turbines located further from the upstream turbine.

Many modifications may be made to the described examples without departing from the scope of the appended claims.

In the described examples, the (upstream) wind turbine to be controlled receives data indicative of wake conditions for a certain wind direction from a single downstream wind turbine. It will be understood, however, that the upstream wind turbine may receive wake condition data from a plurality of downstream wind turbines in a wind park. This data may be combined to determine appropriate wake steering control of the upstream wind turbine that will result in the greatest increase in energy capturing efficiency of the wind park as a whole.

The invention claimed is:

1. A method for controlling a first wind turbine that generates wake during operation, the first wind turbine being part of a wind park comprising a plurality of wind turbines, the method comprising:

receiving, at the first wind turbine and from a second wind turbine of the plurality of wind turbines that is downstream of the first wind turbine, a signal indicative of a severity of wake loss experienced at the second wind turbine;

comparing, by the first wind turbine, the signal indicative of the severity of wake loss experienced at the second wind turbine with a signal of the first wind turbine to determine a wind speed deficit at the second wind turbine;

determining, by the first wind turbine and based on the wind speed deficit at the second wind turbine, one or more wake loss control actions for adjusting wake generated by the first wind turbine; and, controlling the first wind turbine to operate in accordance with the determined one or more wake loss control actions.

2. The method according to claim 1, wherein the one or more wake loss control actions are part of a predefined wake loss control strategy for controlling the first wind turbine to adjust wake generated by the first wind turbine as a function of wind direction in the vicinity of the first wind turbine.

3. The method according to claim 2, wherein the received severity signal is a gain, wherein the predefined wake loss control strategy is a gain-scheduled control strategy, the method comprising applying the gain to the gain-scheduled control strategy to determine the one or more wake loss control actions to be performed, and wherein controlling the first wind turbine comprises controlling the first wind turbine in accordance with the gain-scheduled control strategy.

4. The method according to claim 3, wherein the gain-scheduled control strategy comprises performing one or more wake loss control actions to adjust wake generated by the first wind turbine if the received gain indicates that the severity of wake loss experienced at the second wind turbine is above a predefined threshold, and wherein no wake loss control actions are performed as part of the gain-scheduled control strategy if the received gain indicates that the severity of wake loss experienced at the second wind turbine is below the predefined threshold.

5. The method according to claim 1, the method comprising, at the second wind turbine: determining a severity parameter indicative of the severity of wake loss experienced at the second wind turbine; and, transmitting the determined severity parameter as the severity signal to the first wind turbine.

6. The method according to claim 5, the method comprising: receiving sensor signals from one or more sensors of the second wind turbine; and, determining, based on the received sensor signals, an imbalance parameter indicative of loading imbalance on a rotor of the second wind turbine, wherein the severity parameter is determined based on the determined imbalance parameter and is indicative of a magnitude of the loading imbalance.

7. The method according to claim 6, wherein the sensor signals from one or more sensors are blade load signals from one or more blade load sensors of rotor blades of the second wind turbine, and wherein the imbalance parameter is a yaw moment of the rotor of the second wind turbine, determined based on the received blade load signals.

8. The method according to claim 6, wherein the severity parameter is determined based on a magnitude of the imbalance parameter and on wind direction relative to a defined wind direction in which the second wind turbine experiences a full wake condition.

9. The method according to claim 8, the method comprising determining, based on the magnitude of the imbalance parameter and on wind direction relative to the defined wind direction, a curve describing the imbalance parameter as a function of wind direction or nacelle yaw position; and, comparing the determined shape against a plurality of defined shapes each associated with a respective severity parameter, wherein the severity parameter is determined based on comparing the determined shape against the plurality of defined shapes.

10. The method according to claim 6, wherein the imbalance parameter is normalised based on one or more operating variables; and wherein the severity parameter is determined based on the normalised imbalance parameter; wherein the one or more operating variables include one or more of: a defined peak magnitude of imbalance parameter; wind speed; absolute output power; output power normalised based on rated power, values from a database of measurements of the severity of other turbines in operation at different wind parks; and, an estimated thrust level of the second wind turbine.

11. The method according to claim 1, wherein the signal indicative of a severity of wake loss is received from two or more turbines, and wherein the one or more wake loss control actions for adjusting wake is determined based on the received severity signals severity from the two or more turbines.

12. The method according to claim 1, where in the method comprises controlling, in a control loop, the first wind turbine to operate in accordance with the determined one or more wake loss control actions, to reduce the severity signal to a predefined level.

13. A first wind turbine that generates wake during operation, the first wind turbine being part of a wind park comprising a plurality of wind turbines, the first wind turbine comprising a controller configured to:

receive, from a second wind turbine of the plurality of wind turbines that is downstream of the first wind turbine, a signal indicative of a severity of wake loss experienced at the second wind turbine;

compare the signal indicative of the severity of wake loss experienced at the second wind turbine with a signal of the first wind turbine to determine a wind speed deficit at the second wind turbine;

determine, based on the wind speed deficit, one or more wake loss control actions for adjusting wake generated by the first wind turbine; and, control the first wind turbine to operate in accordance with the determined one or more wake loss control actions.

14. A first wind turbine, comprising:

a tower;

a nacelle disposed on the tower;

a rotor extending from the nacelle;

a plurality of blades connected to a distal end of the rotor; and a controller for controlling the first wind turbine that generates wake during operation in a wind park comprising a plurality of wind turbines, the controller being configured to:

receive, from a second wind turbine of the plurality of wind turbines that is downstream of the first wind turbine, a signal indicative of a severity of wake loss experienced at the second wind turbine;

compare the signal indicative of the severity of wake loss experienced at the second wind turbine with a signal of the first wind turbine to determine a wind speed deficit at the second wind turbine;

determine, based on the wind speed deficit, one or more wake loss control actions for adjusting wake generated by the first wind turbine; and control the first wind turbine to operate in accordance with the determined one or more wake loss control actions.

15. A wind park, comprising:

a plurality of wind turbines, comprising a first wind turbine and a second wind turbine that is downstream of the wind turbine; wherein the first wind turbine comprises:

a first controller for controlling the first wind turbine that generates wake during operation in the wind park, the first controller being configured to:

receive, from the second wind turbine, a signal indicative of a severity of wake loss experienced at the second wind turbine;

compare the signal indicative of the severity of wake loss experienced at the second wind turbine with a signal of the first wind turbine to determine a wind speed deficit at the second wind turbine;

determine, based on the wind speed deficit, one or more wake loss control actions for adjusting wake generated by the first wind turbine; and control the first wind turbine to operate in accordance with the determined one or more wake loss control actions.

16. The wind park of claim 15, further comprising a second controller for controlling the second wind turbine, the second controller being configured to:

determine a severity parameter indicative of the severity of wake loss experienced at the second wind turbine; and, transmit the determined severity parameter as the severity signal to the first controller of the first wind turbine.

* * * * *